United States Patent
Sathyanarayan et al.

(10) Patent No.: US 7,617,257 B2
(45) Date of Patent: Nov. 10, 2009

(54) SYSTEM FOR PERSISTENT CACHING OF LDAP METADATA IN A CLUSTER LDAP SERVER TOPOLOGY

(75) Inventors: Ramaprakash H. Sathyanarayan, Cupertino, CA (US); Ajay Keni, Fremont, CA (US); Hari Sastry, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 11/292,495

(22) Filed: Dec. 1, 2005

(65) Prior Publication Data

US 2006/0123024 A1 Jun. 8, 2006

Related U.S. Application Data

(60) Provisional application No. 60/633,186, filed on Dec. 3, 2004.

(51) Int. Cl.
*G06F 17/30* (2006.01)
(52) U.S. Cl. .................. 707/203; 707/200; 707/204; 707/100; 707/104.1
(58) Field of Classification Search ......... 707/201–204, 707/100–104.1; 709/101, 201
See application file for complete search history.

(56) References Cited

U.S. PATENT DOCUMENTS

| | | | |
|---|---|---|---|
| 6,498,612 B1 * | 12/2002 | Brown et al. ............... | 715/762 |
| 6,587,856 B1 | 7/2003 | Srinivasan et al. | |
| 6,615,223 B1 * | 9/2003 | Shih et al. ................... | 707/201 |
| 6,708,187 B1 * | 3/2004 | Shanumgam et al. ....... | 707/201 |
| 6,748,374 B1 | 6/2004 | Madan et al. | |
| 6,834,286 B2 | 12/2004 | Srinivasan et al. | |
| 7,107,297 B2 * | 9/2006 | Yellepeddy et al. ......... | 707/204 |
| 7,340,739 B2 * | 3/2008 | Alam ......................... | 717/175 |
| 2002/0156814 A1 * | 10/2002 | Ho ............................. | 707/514 |
| 2004/0243576 A1 | 12/2004 | Shrivastava et al. | |
| 2005/0165807 A1 | 7/2005 | Srinivasan et al. | |
| 2005/0267921 A1 * | 12/2005 | Bali et al. .................... | 707/204 |
| 2005/0278384 A1 | 12/2005 | Lin et al. | |
| 2006/0047641 A1 | 3/2006 | Keni | |
| 2006/0059539 A1 | 3/2006 | Shashikumar et al. | |
| 2006/0149760 A1 | 7/2006 | Keni et al. | |
| 2006/0155777 A1 | 7/2006 | Shih et al. | |
| 2006/0155778 A1 | 7/2006 | Sharma et al. | |
| 2007/0118878 A1 | 5/2007 | Sastry et al. | |
| 2007/0288903 A1 | 12/2007 | Manglik et al. | |

* cited by examiner

*Primary Examiner*—Cam-Linh Nguyen
(74) *Attorney, Agent, or Firm*—Vista IP Law Group, LLP

(57) ABSTRACT

Systems and methods for providing consistent metadata in a cluster database system are disclosed. Each node contains a number of LDAP server instances, as well as a monitor process. Each node contains a node shared memory, and the cluster contains a cluster shared memory stored on a directory store. When a client alters metadata in one of the LDAP server instances, the LDAP server instances writes the changes to the directory store, and provides update information, such as a version number, to the node shared memory. Other server instances on that node poll the node shared memory to determine whether updates have been made. If updates have been made, the other server instances update their on-heap caches based on the directory store. Each monitor process determines whether changes have been made to the cluster shared memory, and if so, updates the node shared memory based on the directory store.

27 Claims, 16 Drawing Sheets

LDAP client performing the LDAP ACP metadata change for the entry c=us on Node 1.

LDAP server making the metadata changes to the Relational Database on node 1.

LDAP server incremented it's LDAP metadata heap version and the DN of the entry that changed, after successfully changed the LDAP metadata in the Relational Database.

LDAP Server incrementing the LDAP metatdata version and copying entry DN that changed to the shared memory on Node 1.

LDAP servers recognize the change of LDAP metadata version in the shared memory, update their LDAP metadata heap version, and read the change from the Relational database for the LDAP metadata change on Node 1 for the entry c=us.

Monitor polls Node shared memory to check for changes, copies the changed version number to its heap and to Cluster Shared Memory Table in the Relational Database Directory store on Node 1.

Monitor reads Cluster Shared Memory Table in the Relational Database Directory store on Node 2 recognizes the change and updates it's LDAP metadata heap version.

MONITOR makes LDAP metadata version change to shared memory on Node 2.

LDAP server recognizes the LDAP metadata change in the Shared memory and updates its LDAP metadata heap version on Node 2.

LDAP server reads the LDAP metadata change for the entry c=us on Node 2.

US 7,617,257 B2

SYSTEM FOR PERSISTENT CACHING OF LDAP METADATA IN A CLUSTER LDAP SERVER TOPOLOGY

RELATED APPLICATION

This application claims the benefit of U.S. Provisional Application No. 60/633,186, entitled "SYSTEM FOR PERSISTENT CACHING OF LDAP METADATA IN A CLUSTER LDAP SERVER TOPOLOGY", filed Dec. 3, 2004, which is hereby incorporated by reference in its entirety.

FIELD

Embodiments of the invention relate to computer systems, and more particularly to propagation of information in a database cluster.

BACKGROUND OF THE INVENTION

Many applications servers contain directories to aid clients in fast lookup of information. For example, within a database system, an application server such as the Oracle Application Server may contain a directory, such as the Oracle Internet Directory.

Lightweight Directory Access Protocol (LDAP) is an Internet protocol that applications may use to look up information. An LDAP server may allow applications to access information contained in directories.

Some enterprise and telecommunications systems have a requirement for high availability and for highly integrated collaboration. For example, within the enterprise application space or the telecommunication application space, a large suite of applications may be required. Required applications may include a LDAP server, in addition to applications such as the Oracle Collaboration Suite, and any custom applications.

In order to provide high availability, an LDAP Server may be deployed on multiple hardware nodes. A database system containing several nodes may be known as a cluster. However, there is a need to maintain synchronized data across the nodes in a cluster.

SUMMARY OF THE INVENTION

Systems and methods for providing consistent metadata in a cluster database system are disclosed. Each node contains a number of LDAP server instances, as well as a monitor process. Each node contains a node shared memory, and the cluster contains a cluster shared memory stored on a directory store. When a client alters metadata in one of the LDAP server instances, the LDAP server instances writes the changes to the directory store, and provides update information, such as a version number, to the node shared memory. Other server instances on that node poll the node shared memory to determine whether updates have been made. If updates have been made, the other server instances update their on-heap caches based on the directory store. Each monitor process determines whether changes have been made to the cluster shared memory, and if so, updates the node shared memory based on the directory store.

In one implementation, a method for managing metadata includes receiving a change request and modifying a LDAP image based on the request. The method further includes updating a change log based on the change to the LDAP image, updating one or more server instances, and updating one or more nodes.

DETAILED DESCRIPTION

Overview

Figure 1:
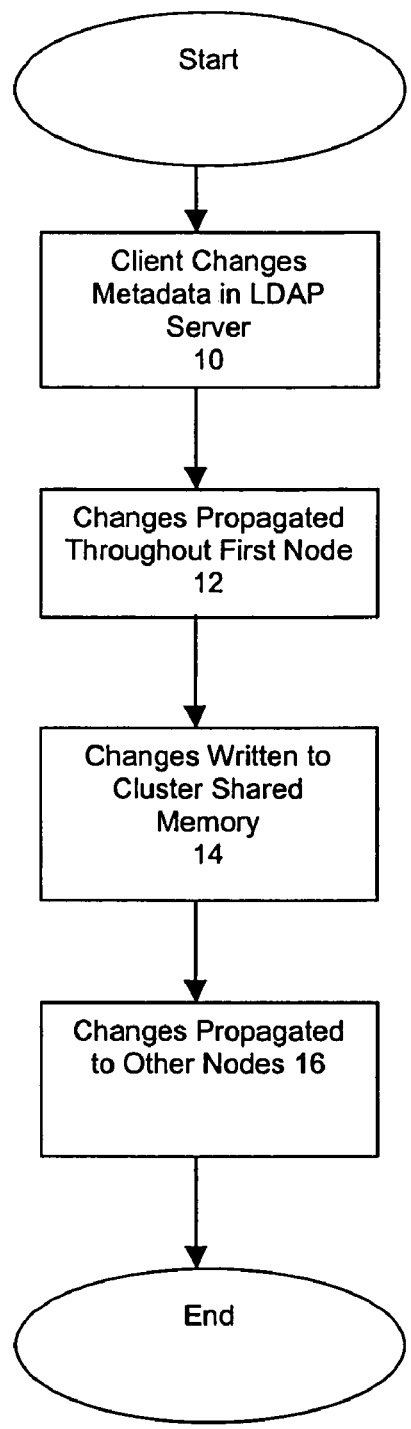
FIG. 1 is a flow chart depicting a method for synchronizing data across multiple nodes, in accordance with an embodiment of the invention.

FIG. 1 is a flowchart illustrating a method for synchronizing data across multiple nodes. As shown in FIG. 1, the method may begin in step 10, wherein a client may make changes in a first node. The method may continue in step 12, wherein the changes may be propagated throughout the first node. In step 14, the changes may be written to a cluster shared memory. In step 16, the changes may be propagated to other nodes in the cluster.

Figure 2:
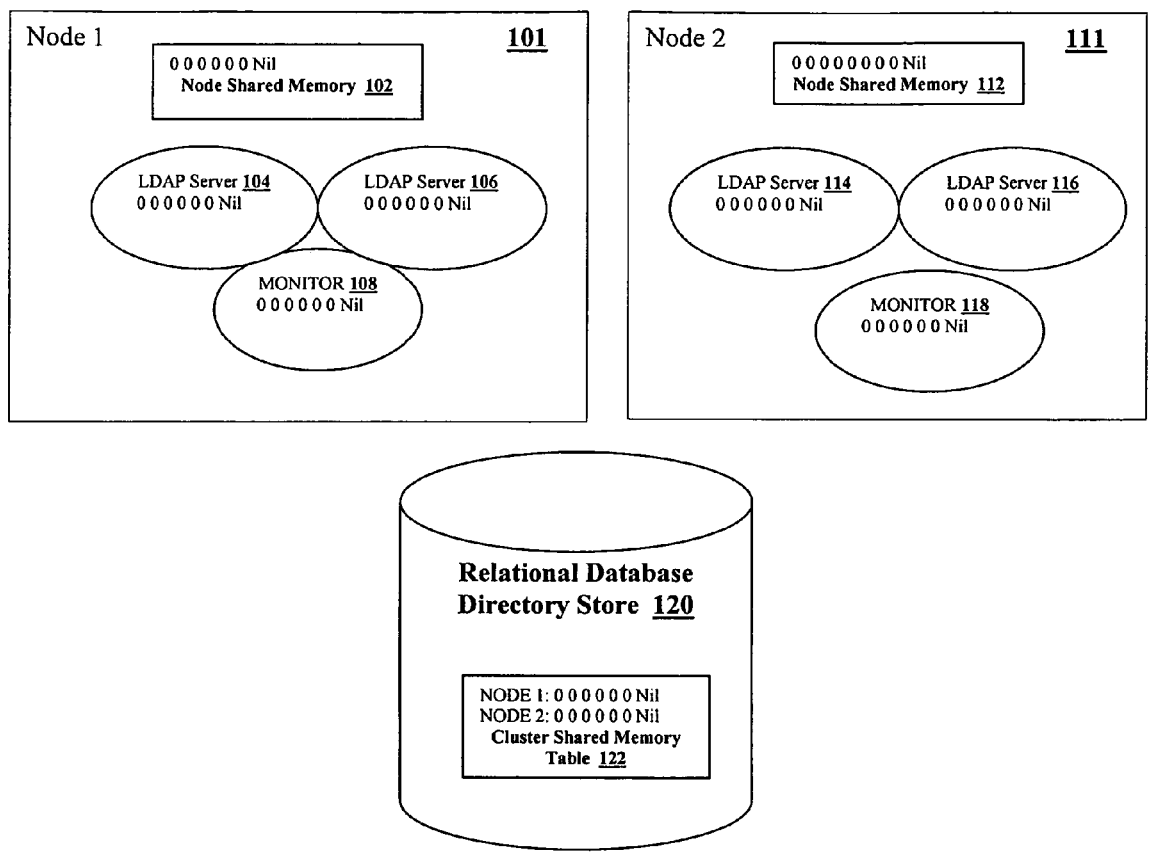
FIG. 2 is a block diagram illustrating a database system, in accordance with an embodiment of the present invention.

FIG. 2 is a block diagram illustrating a database system. As shown in FIG. 2, an LDAP Server cluster conFIGuration may include LDAP Server instances 104, 106 in node 101 and LDAP Server Instances 114, and 116 on node 111. The LDAP Server instances 104, 106 in node 101 and LDAP Server Instances 114, and 116 on node 111 share the same Directory Store 120 and hence present the same directory content across all the nodes. A Directory Store is a relational database of entries, attributes, and metadata. FIG. 2 shows a small number of nodes and server instance for clarity but the number of server instance and nodes is not limited.

The LDAP server instances 104, 106, 114, 116 may cache certain LDAP metadata information on their respective heaps. The metadata information, for example, can include Access Control Policy (ACP), LDAP Schema, Root DSE values, Privileged Groups, Cataloged Attributes Information, Password Policy, Password Verifier Profile, Directory Server Configuration Information, LDAP Plug-in Configuration Information, and the like. Without a mechanism to synchronize these on-heap metadata caches across multiple LDAP Server instance on the same node and LDAP Server instances on multiple hardware nodes, the above LDAP Server Cluster configuration requirement is unattainable.

In order to synchronize the on-heap metadata caches, a monitor 108, 118 may be provided on each node 101, 111. A node monitor, such as Oracle Internet Directory monitor, is a process that exists on each node. The Monitor 108 resides on node 101 and Monitor 118 resides on Node 111. The Monitor process is started on all nodes. The Monitor process is responsible for starting the LDAP Server instances on its node. The Monitor is also responsible for both conveying the messages to the Monitor on other nodes about the LDAP metadata changes from its node, and for conveying metadata changes made by other nodes to the LDAP Server instances on its node.

Each Monitor 108, 118 uses node shared memory to communicate to the LDAP Server instances on its node. For example, Monitor 108 uses Node Shared Memory 102 for Node 101 and Monitor 118 uses Node shared Memory 112 for Node 111. The Cluster Shared Memory 122 is stored in Directory Store 120, and is used in the relational schema for communicating to the Monitor on other nodes. Monitors 108 and 118 each create one row in the Cluster Shared Memory Table 122 when they are initiated, and delete the same row when shutting down. Monitor 108 identifies its row in the Cluster Shared Memory Table 122 with a key being the hostname, represented by "NODE 1", Monitor 118 is represented by "NODE 2" in the Cluster Shared memory 122 in FIG. 1. Monitor 108 makes updates to only its row and reads the rows of other nodes. The Monitor reads the Node Shared Memory 102 metadata cache versions and copies them to its row in the Cluster Shared Memory Table 122.

Node Shared memory 102, 112 is a placeholder for keeping the version number represented by "0 0 0 0 0 0" and content of change represented by "Nil" ("Nil" indicates no change) of each LDAP Server Instance. The Cluster Shared Memory Table 122 contains the copy of shared memory for each node.

In operation, the LDAP Servers and Monitors compare the on-heap LDAP metadata cache versions with the Node shared memory LDAP metadata cache version to check for any changes. For example, the LDAP servers 104 and 106 and Monitor 108 poll the Node shared memory 102 and compare their on-heap LDAP metadata cache versions with the Node shared memory 102 LDAP metadata cache version to check for any changes.

Initializing the System

Figure 3:
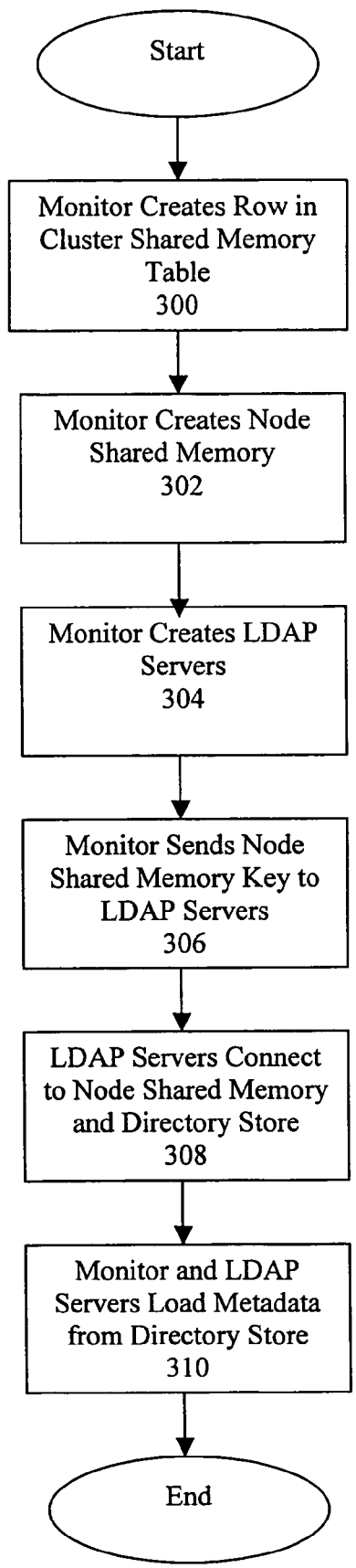
FIG. 3 is a flow chart depicting a method for initializing a database system, in accordance with an embodiment of the invention.

FIG. 3 is a flow chart illustrating a method for initializing a database system. As shown in FIG. 3, the method may begin in step 300, wherein each Monitor creates a row in the Cluster Shared Memory Table. In step 302, each Monitor creates a Node Shared Memory segment.

In step 304, each monitor may create one or more LDAP Server Instances. In step 306, the monitor sends the Node Shared Memory key to each LDAP Server Instance. The key can be sent, for example, via a command line argument. Each LDAP server connects to the Node Shared Memory and to the Directory Store in step 308.

In step 310, metadata is loaded from the Directory Store. Each LDAP server loads the LDAP metadata from the Directory Store to its heap, and initiates the shared memory with its cache metadata. For example, the cache metadata may specify version "0 0 0 0 0 0." Both Monitors (108 and 118) and LDAP servers (104, 106, 114, 116) make their own copy of shared memory LDAP metadata cache version to their respective heap memories.

Propagating Changes

Figure 4:
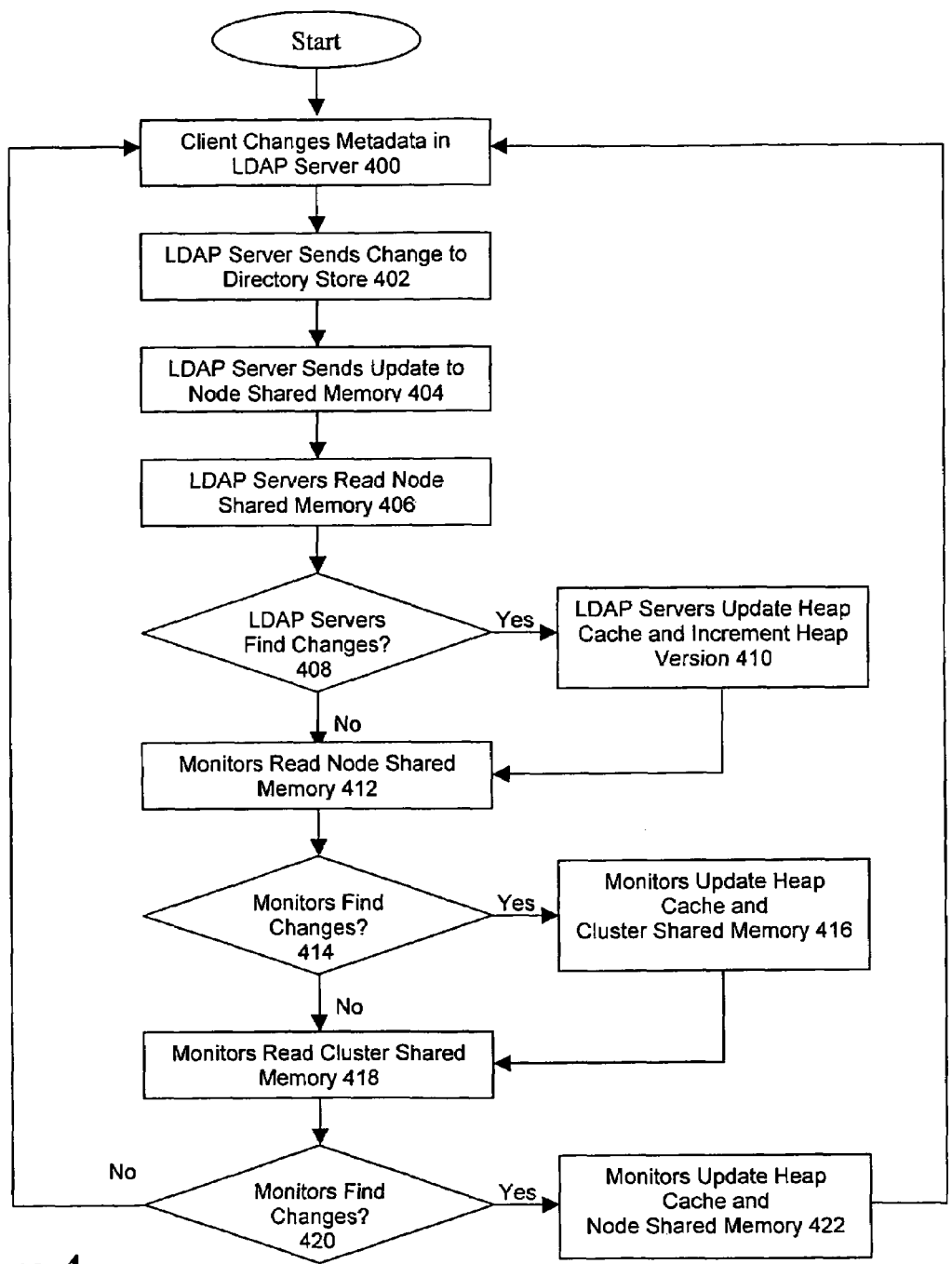
FIG. 4 is a flow chart depicting a method for updating a database system, in accordance with an embodiment of the invention.

FIG. 4 is a flow chart illustrating a method for propagating changes in a database system. As shown in FIG. 4, the method may begin in step 400, wherein a client may perform an action that affects the metadata in a LDAP server, or may otherwise change the data in a LDAP server. The method may continue in step 402, wherein the LDAP server may send the updated metadata to the Directory Store, or otherwise send the change to the directory store. In step 404, the LDAP server may send a metadata update to the Node Shared Memory. The metadata update sent to the Node Shared Memory may not include the actual changes made to the metadata, but may provide version information or other information sufficient to determine whether changes have been made to the metadata.

The LDAP servers on each node may routinely poll the node shared memory to determine whether an update to the metadata has been made. The LDAP servers may read the node shared memory in step 406, and determine whether an update has been made in step 408. The LDAP servers may determine whether an update has been made 408, for example, by comparing the version number of their on-heap cache to the version number stored in the node shared memory.

If an update has been made, the LDAP servers may update their on-heap cache and increment their version number 410. For example, the LDAP servers may update their on-heap cache by retrieving current data from the directory store, and may increment their version number to match the version number stored in the node shared memory.

The monitors on each node may also routinely poll the node shared memory to determine whether an update to the metadata has been made. The monitors may read the node shared memory in step 412, and determine whether an update has been made in step 414. The monitors may determine whether an update has been made 414, for example, by comparing the version number of their on-heap cache to the version number stored in the node shared memory.

If an update has been made, the monitors may update their on-heap cache and the cluster shared memory 416. For example, the monitors may update their on-heap cache by retrieving current data from the directory store, and may increment their version number to match the version number stored in the node shared memory. The monitors may further update the cluster shared memory, for example, by writing changes to the appropriate row in the cluster shared memory table.

The monitors on each node may also routinely poll the cluster shared memory to determine whether an update to the metadata has been made. The monitors may read the cluster shared memory in step 418, and determine whether an update has been made in step 420. The monitors may determine whether an update has been made 408, for example, by comparing the version number of their on-heap cache to the version numbers stored in the cluster shared memory.

If an update has been made, the monitors may update their on-heap cache and the node shared memory 416. For example, the monitors may update their on-heap cache by retrieving current data from the directory store, and may increment their version number to match the version number stored in the cluster shared memory. The monitors may further update the node shared memory, for example, by updating the version number and/or by writing changes to the node shared memory.

Illustrative Example

The illustrative example refers to FIG. 5 through FIG. 14. Initially LDAP metadata versions on all objects are set to 0 depicted as "0 0 0 0 0 0".

Figure 5:
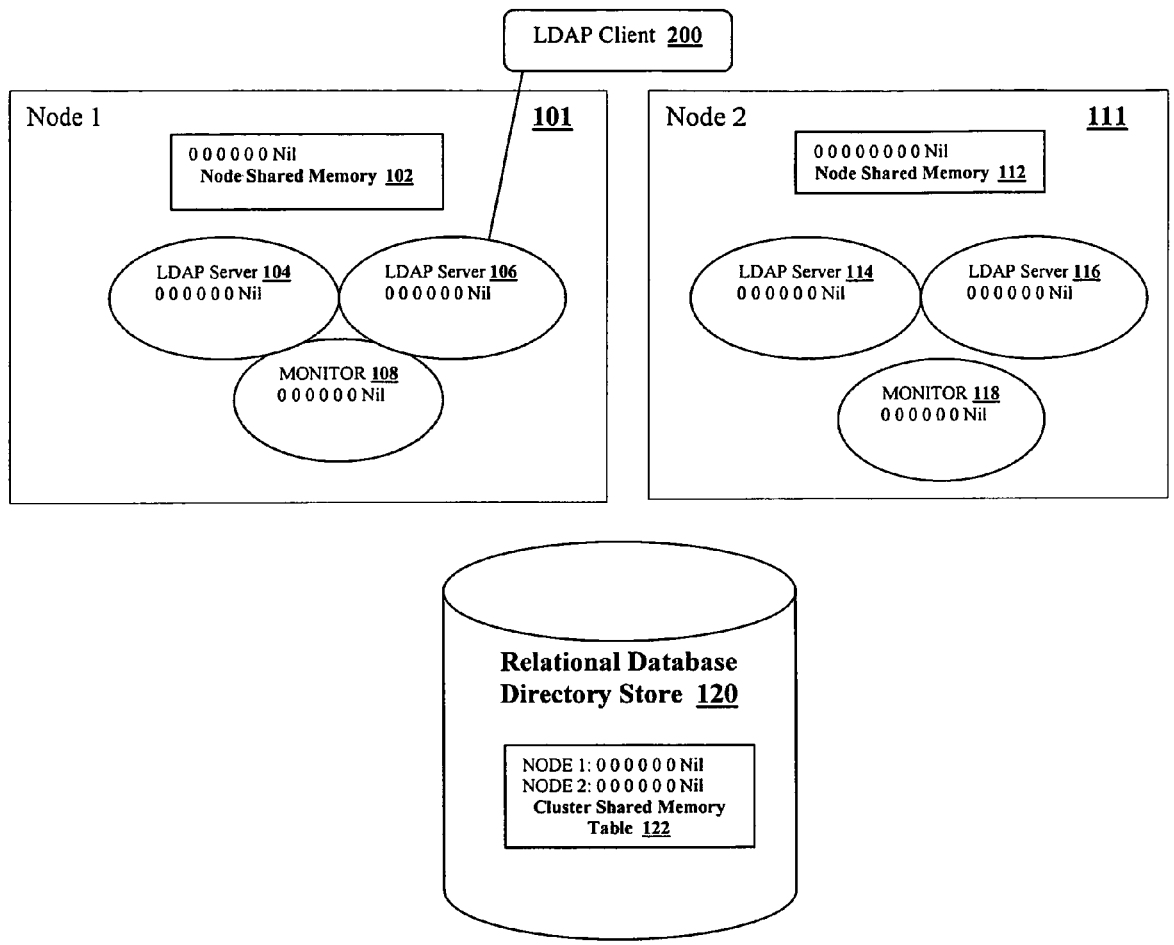
FIGS. 5-14 are block diagrams illustrating the states of a database system during an exemplary database update operation, in accordance with an embodiment of the present invention.
Figure 6:
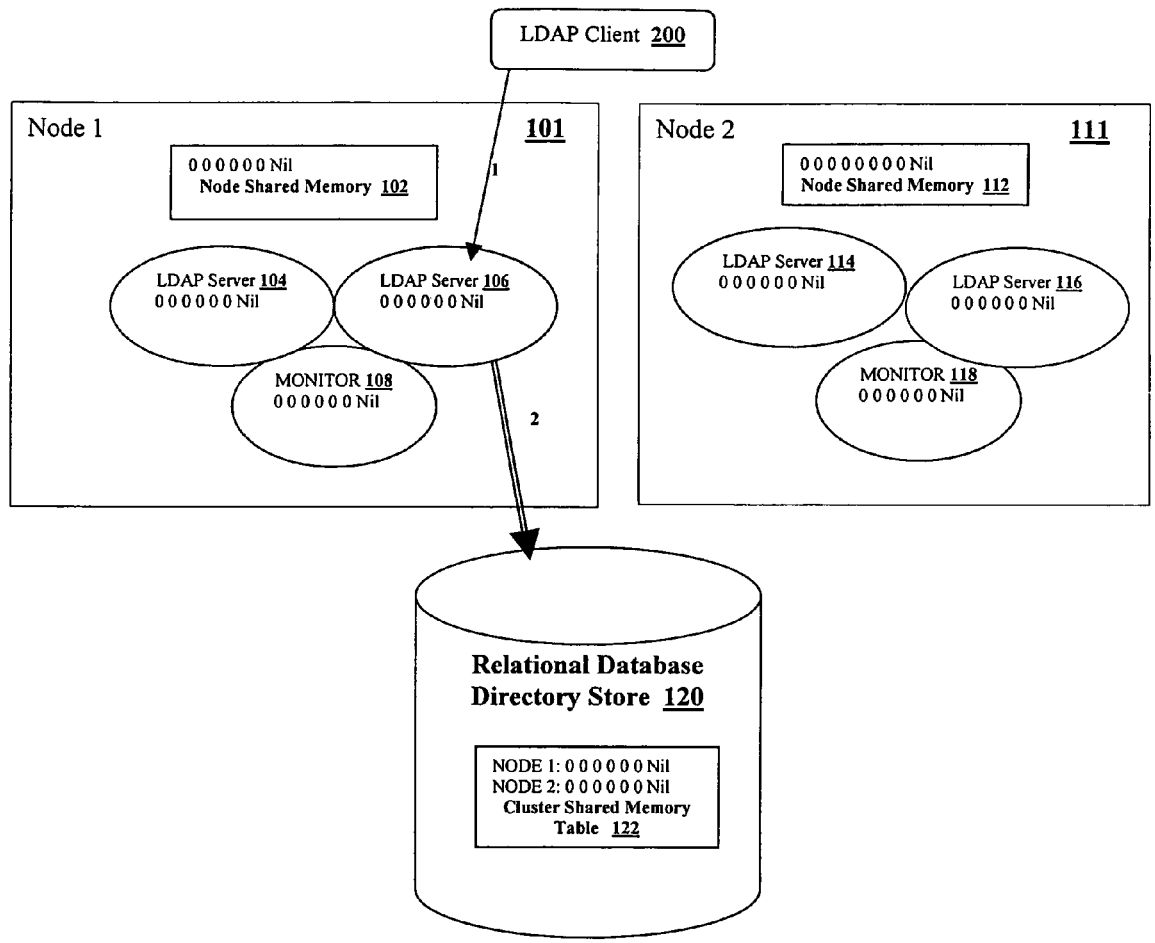
Figure 7:
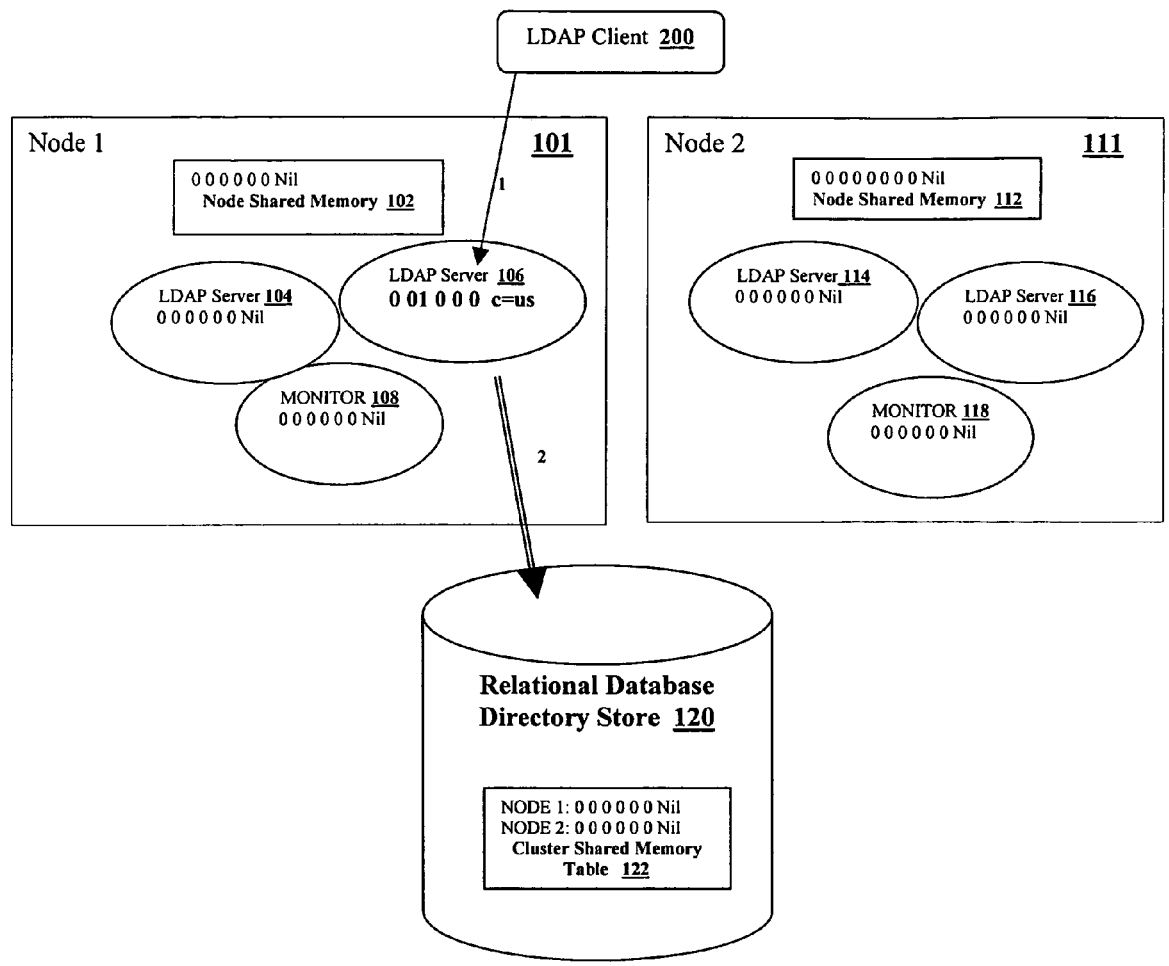
Figure 8:
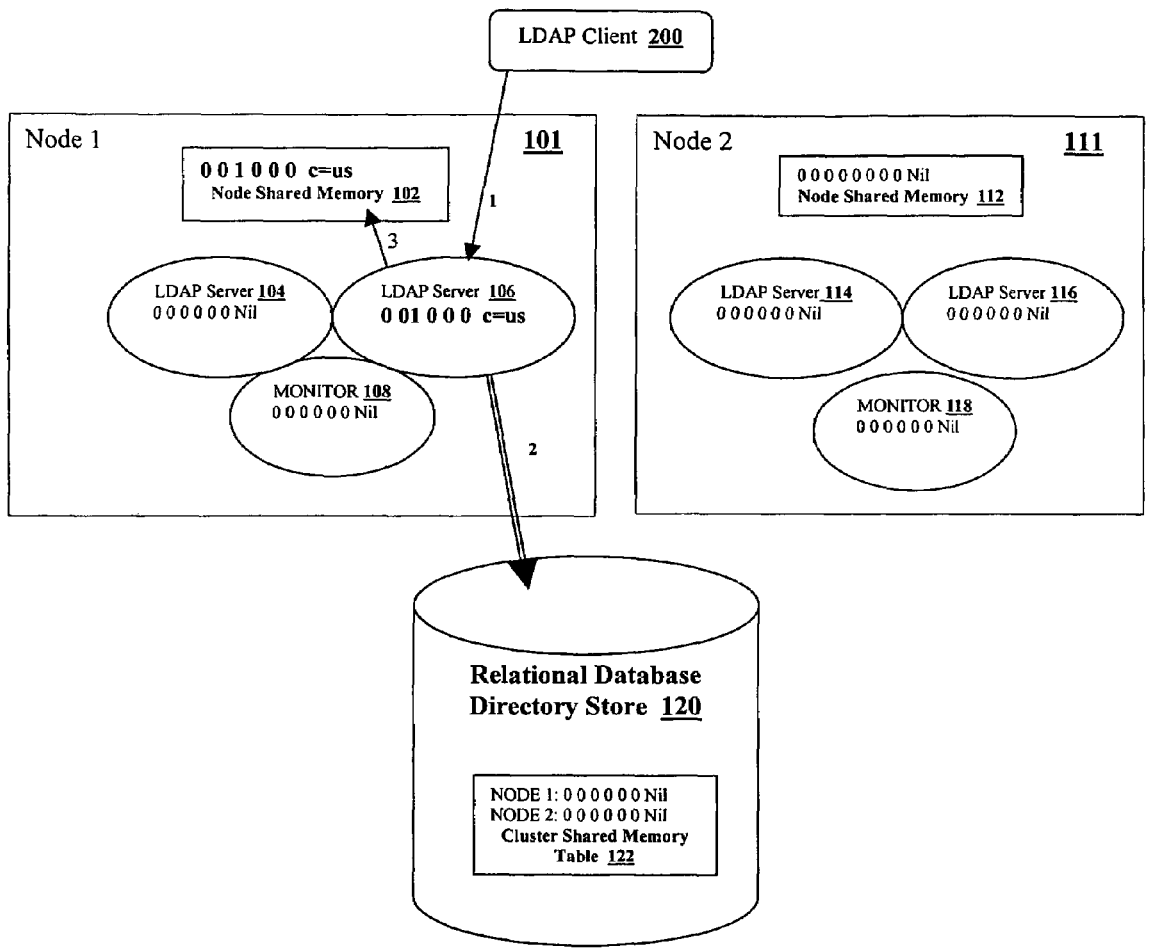
Figure 9:
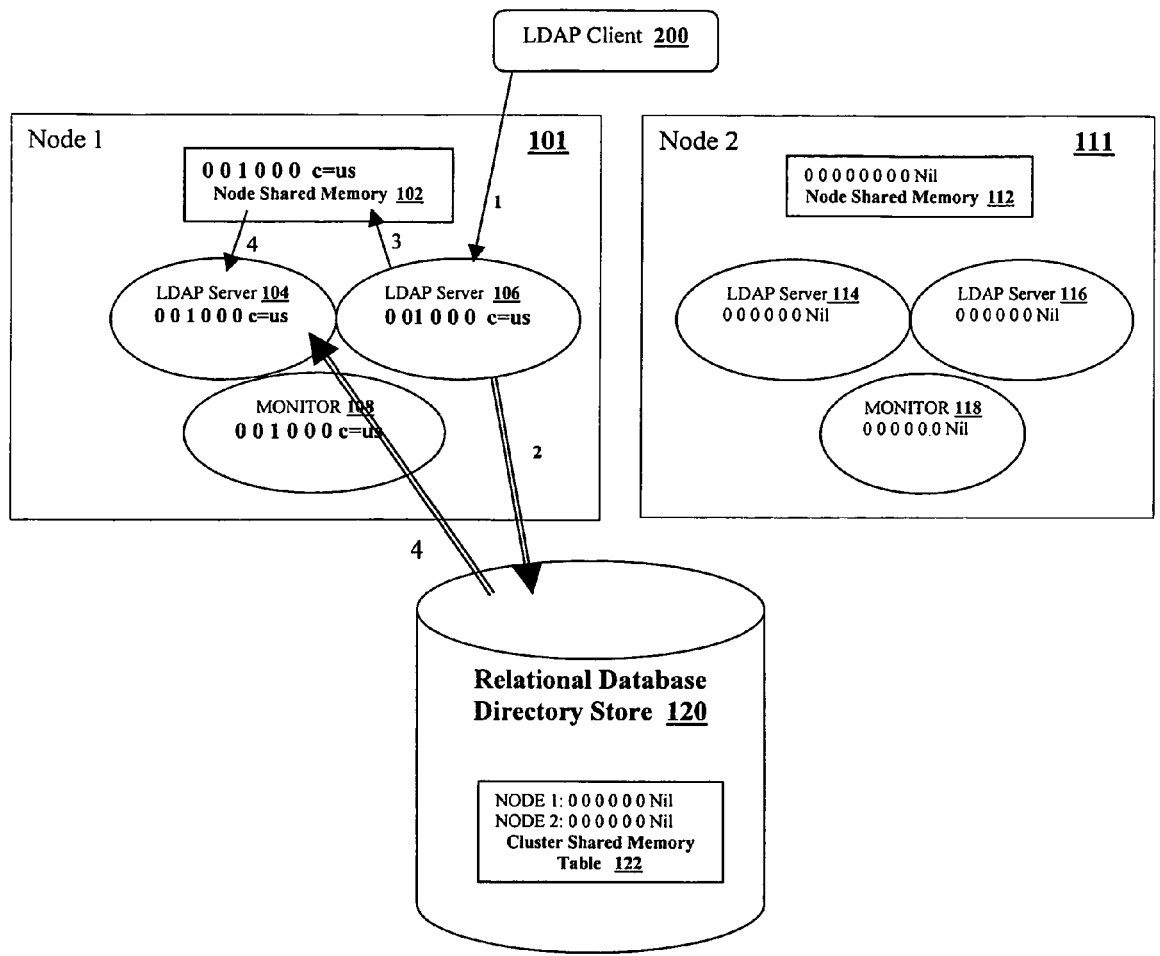
Figure 10:
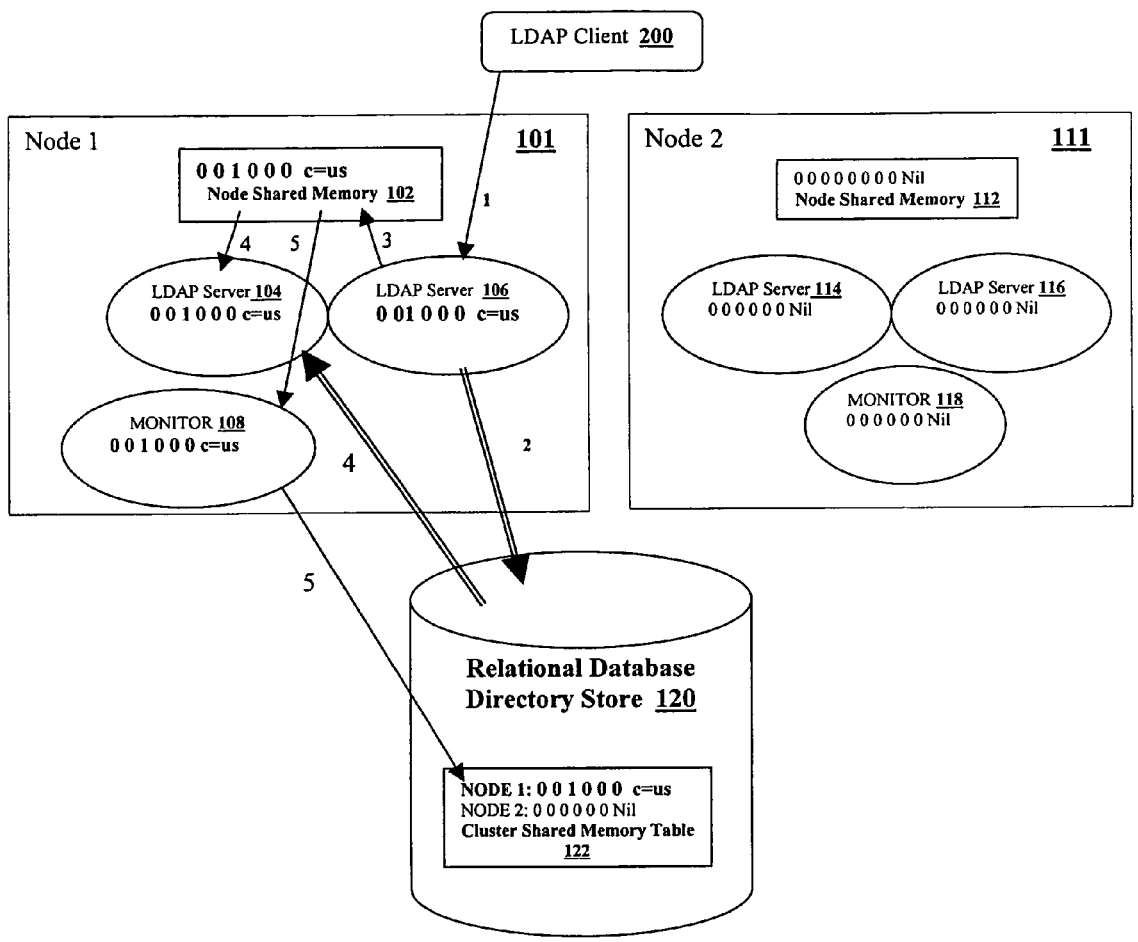
Figure 11:
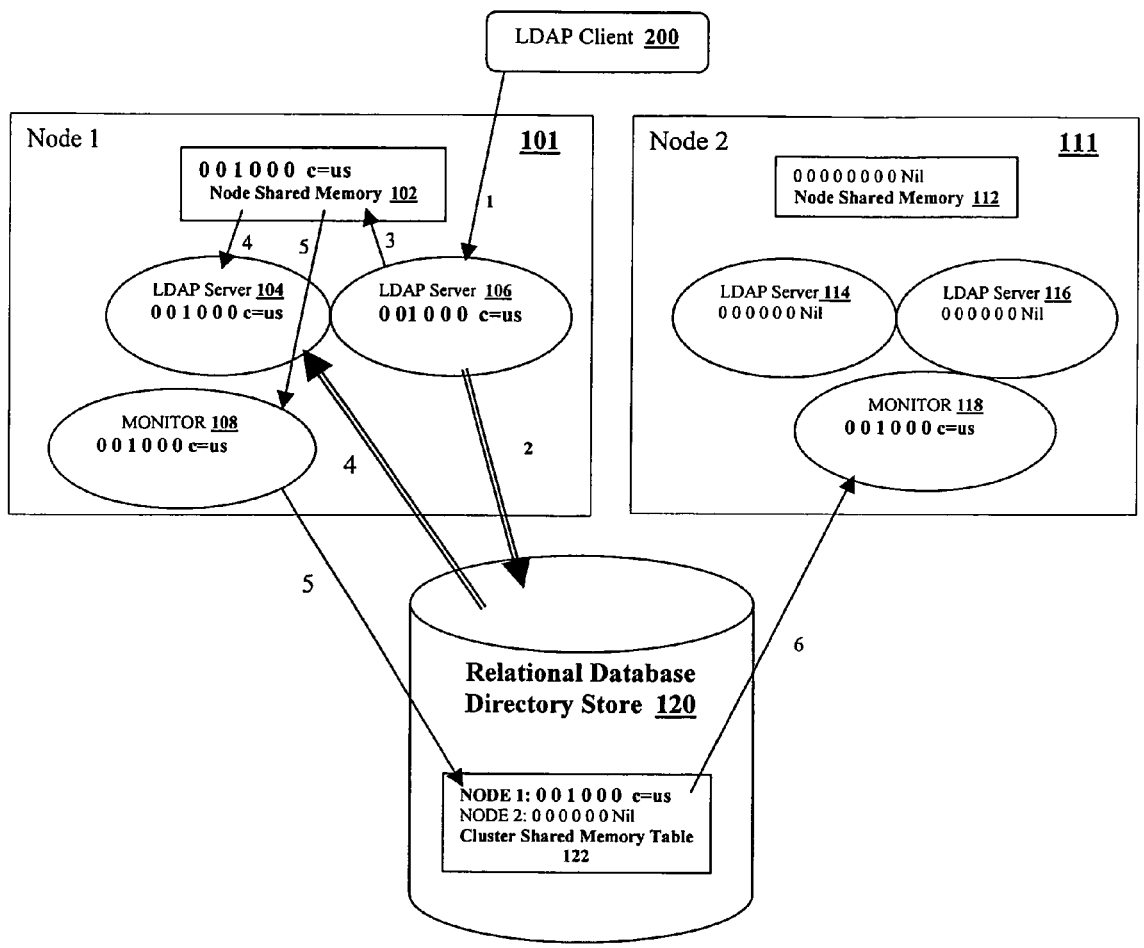
Figure 12:
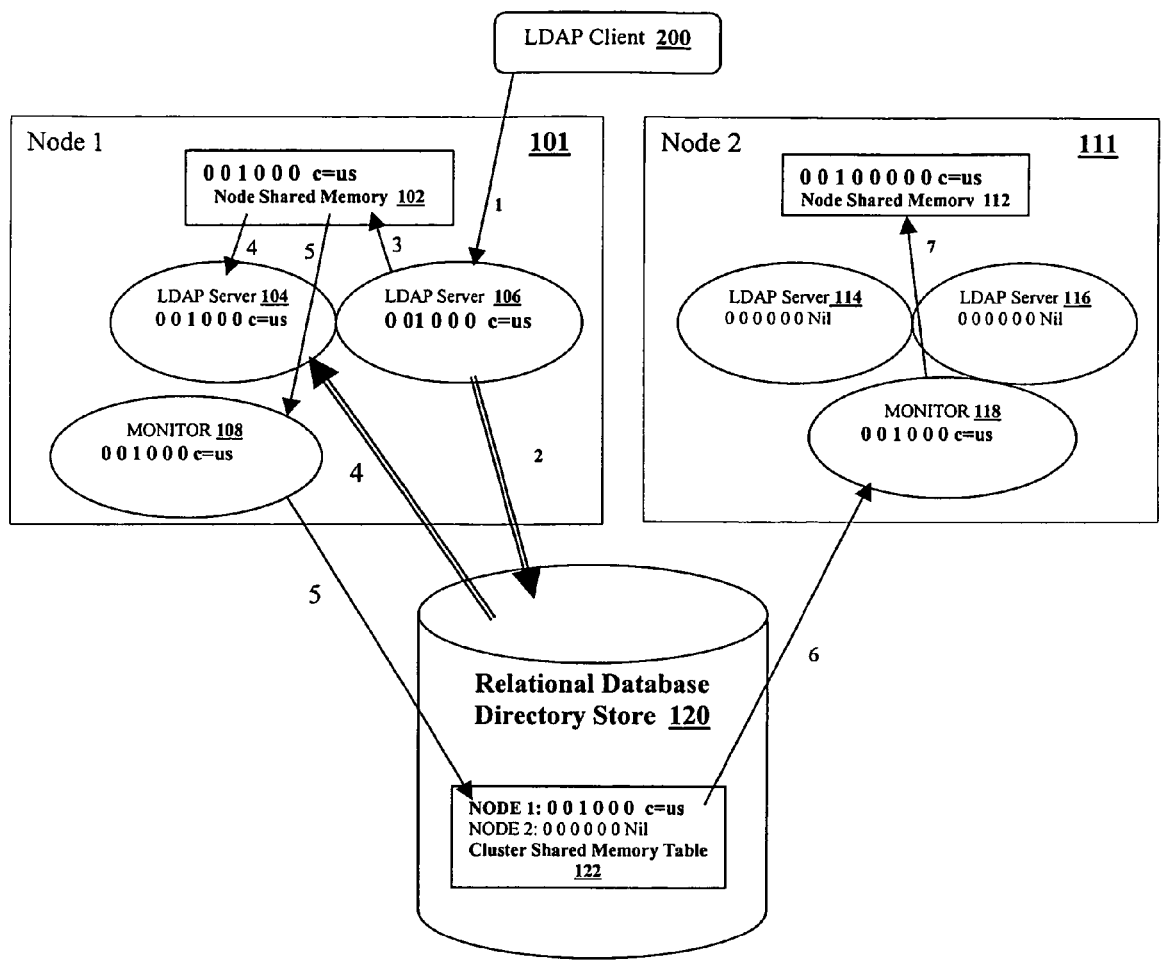
Figure 13:
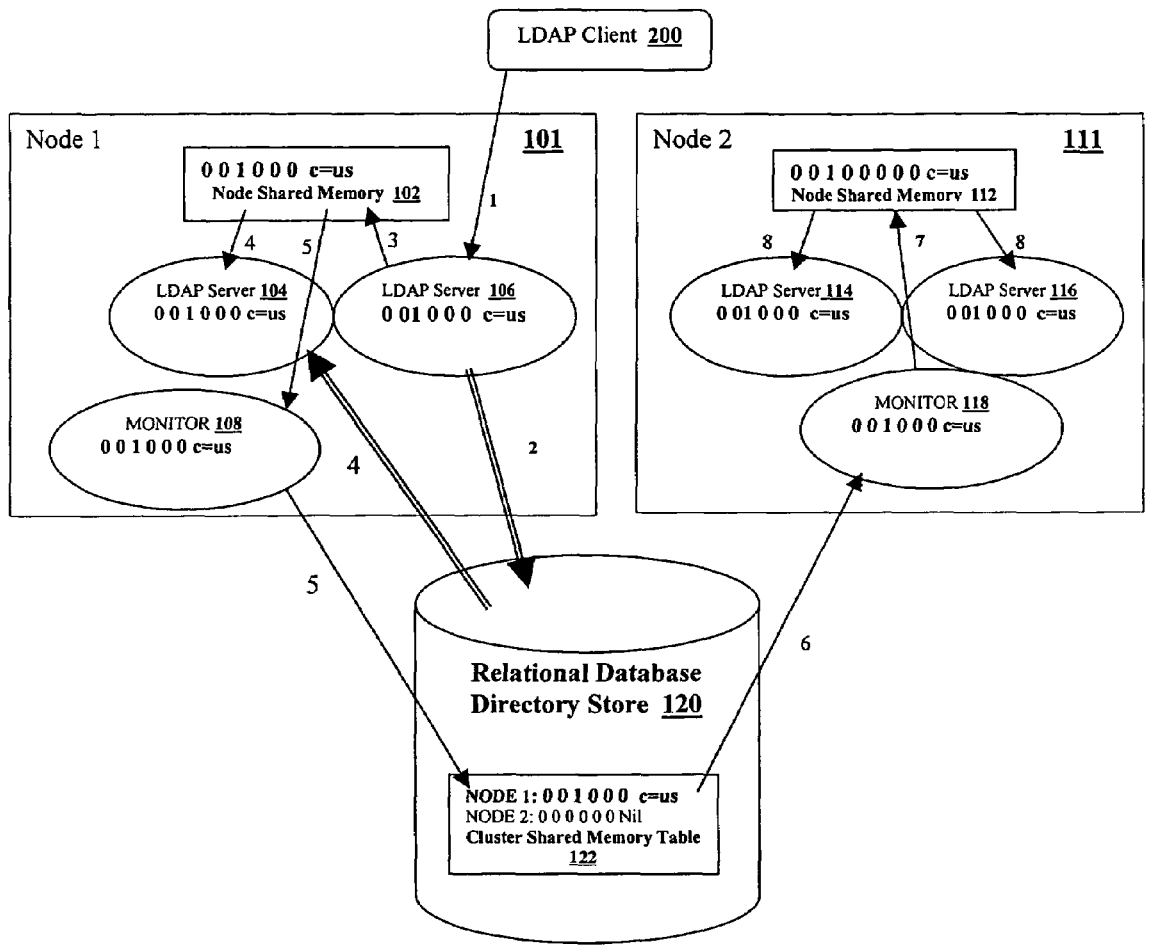
Figure 14:
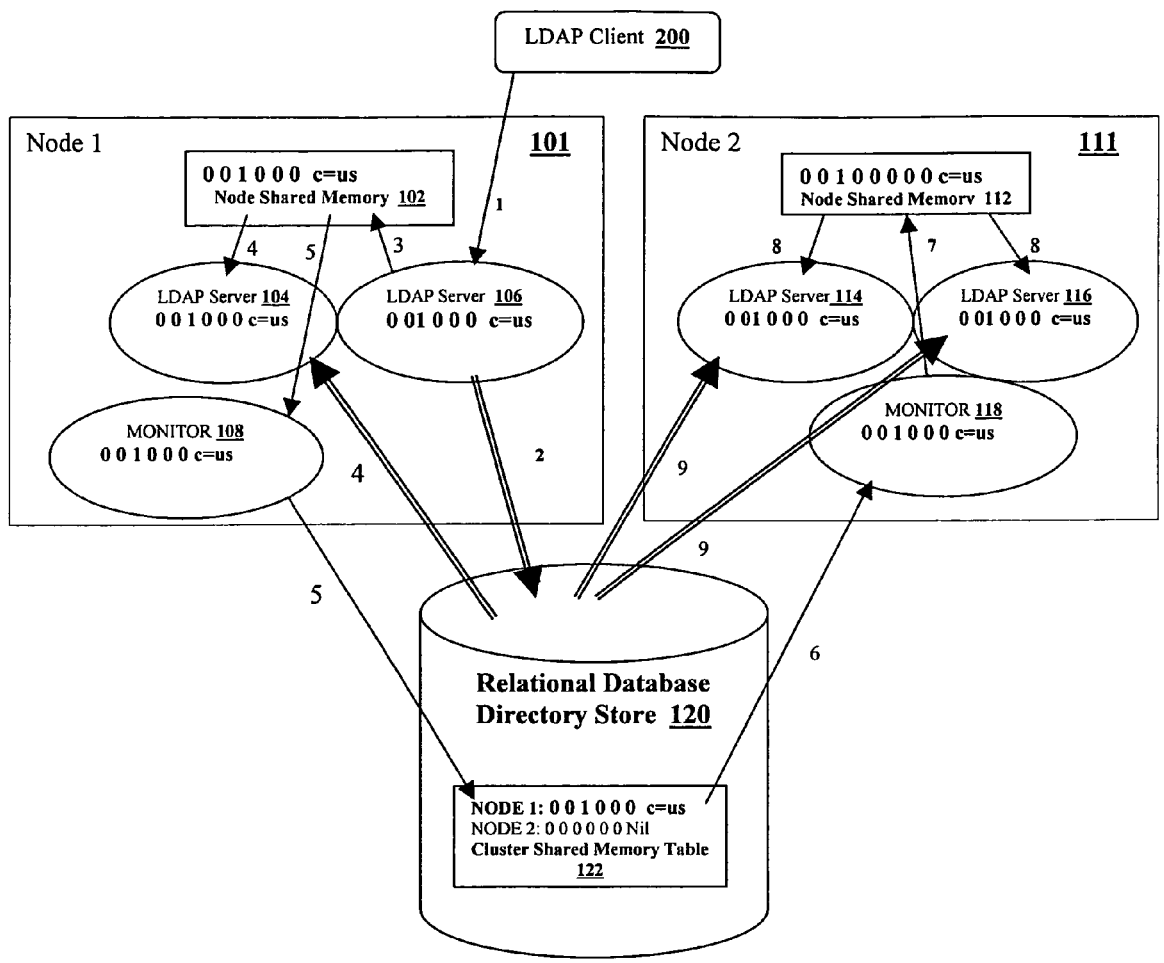

When any LDAP client 200 in FIG. 5 initiates an LDAP metadata change (arrow 1, FIG. 5) on LDAP server instance 106, the server instance also sends the change to Directory Store 120 (arrow 2, FIG. 6). The version of the LDAP metadata cache in the heap of LDAP Server Instance 106 is incremented in FIG. 7 to "0 0 1 0 0 0" and the change information is changed to "c=us" indicating one of the metadata attributes of the entry "c=us" is changed. Arrow 3 of FIG. 8 represents Server Instance 106 propagating the metadata version update to the Node Shared Memory 102 cached metadata version. Arrow 1 and 2 are distinct from arrow 3, as Arrows 1 and 2 represents entry change data, whereas Arrow 3 represents metadata version data. Other LDAP servers on the same node (e.g., 104) compare their heap metadata version with the Node Shared Memory 102 version. Server Instance 104 recognizes the change in the shared memory and updates its LDAP metadata cache from the Directory Store 120 and increments its heap version for that LDAP metadata as shown in Arrows 4 of FIG. 9. Monitor 108 compares its heap copy of LDAP metadata cache version with the LDAP metadata cache version on Node Shared Memory 102. When the LDAP metadata version on Node Shared Memory 102 is greater than Monitor 108's heap LDAP metadata cache version, then the Monitor 108 copies the Node Shared Memory 102 LDAP metadata cache version to the Cluster Shared Memory 122 and to its own heap shown by Arrows 5 of FIG. 10. The Cluster Shared Memory 122 is the mechanism for notifying other nodes about the LDAP metadata cache change.

Monitor 118 from Node 111 reads the rows of the other nodes from the Cluster Shared Memory Table 122 and compares its heap LDAP metadata cache version with the version of the other nodes in Cluster Shared Memory 122. If the version of the LDAP metadata in the Cluster Shared Memory Table 122 is greater than metadata heap version in Monitor 118, Monitor 118 copies the version number from Cluster Shared Memory 122 to its heap shown in Arrow 6 in FIG. 11, and Monitor 118 further copies the version number from Cluster Shared Memory 122 to Node Shared Memory 112 shown by Arrow 7 in FIG. 12. LDAP server instances 114 and 166 on this node 111 compare their heap metadata version with the Node Shared Memory 112 version. The server instances recognize the change in Node Shared Memory 112 and increments their heap version for that LDAP metadata in Arrows 8 shown in FIG. 13, and update their LDAP metadata cache from the Directory Store 120 shown by Arrows 9 in FIG. 14. This is the mechanism for consuming the LDAP metadata change made by the remote OID node to local node.

Figure 15:
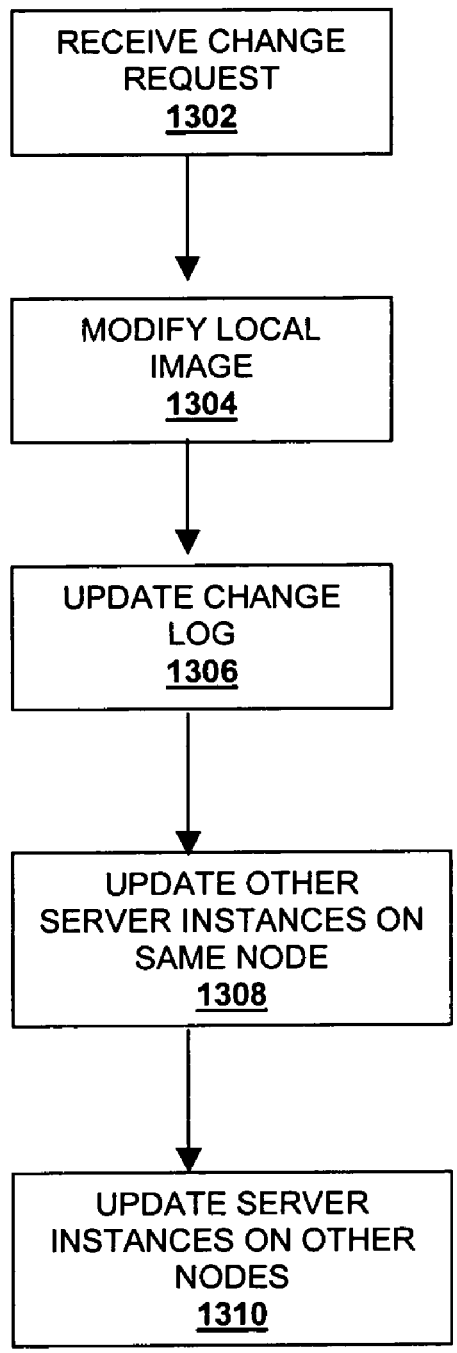
FIG. 15 is a flow chart illustrating a method for updating a database system, in accordance with an embodiment of the present invention.

The illustrative example described above follows process 1300, the persistent caching process. Process 1300 is shown in FIG. 15. A change is received In process action 1302. Process action 1304 modifies the LDAP image on the local Server. In process action 1306, the local LDAP Server updates a change log based on the change received. The remaining Server instances on the node are updated in process action 1308. In process action 1310 the server instances on the other nodes are updated based on the original change in process action 1302.

Computer Architecture

Figure 16:
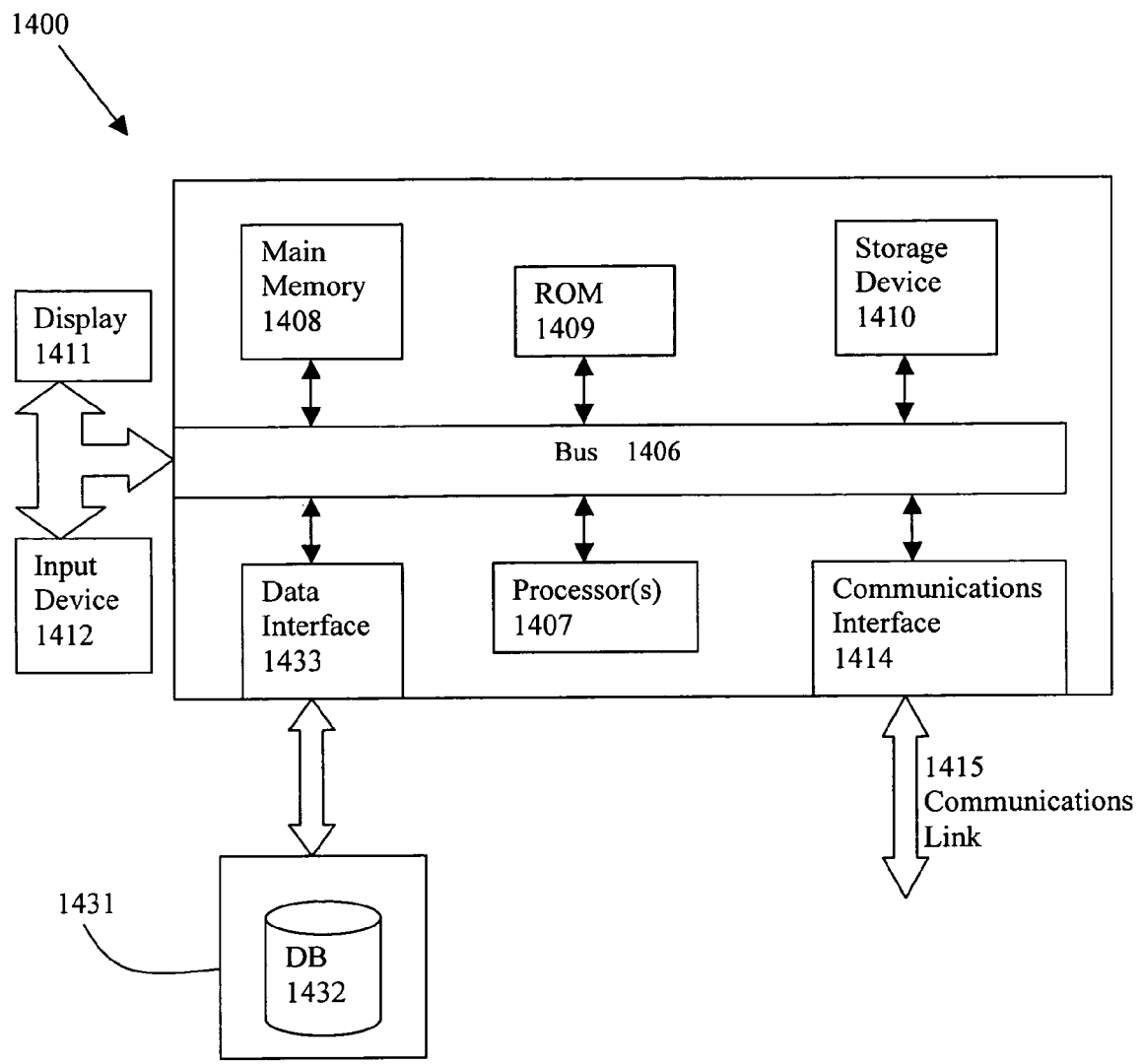
FIG. 16 is a block diagram illustrating a computer system in which embodiments of the invention may be practiced.

The execution of the sequences of instructions required to practice the embodiments may be performed by a computer system 1400 as shown in FIG. 16. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 16, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A computer-implemented method for managing metadata of a cluster database system, comprising:
   receiving a change request at a server of the cluster database system, wherein the cluster database system comprises a multi-node Lightweight Directory Access Protocol (LDAP) networks and a node of the multi-node LDAP network comprises the server and one or more additional servers;
   modifying an LDAP image at the server based on the request;
   updating a change log based on a metadata change to the LDAP image;
   updating one or more server instances that are associated with the node based at least in part on the metadata change to the LDAP image;
   updating one or more additional nodes of the LDAP network based at least in part on the metadata change to the LDAP image, wherein the one or more additional nodes share a schema with the node; and
   storing the metadata change in a storage area of a volatile or non-volatile computer-usable medium.

2. The method of claim 1, wherein the act of modifying the LDAP image comprises:
   modifying a first server instance local cache.

3. The method of claim 1, wherein the act of updating the change log comprises:
   storing information regarding the change into a node change log, the node change log available to all server instances on a node; and
   storing information regarding the change into a cluster change log, the cluster change log available to all nodes in a cluster.

4. The method of claim 3, wherein the act of updating the one or more server instances comprises:
   polling the node change log;
   updating a second server instance metadata cache based on the node change log; and
   updating a second node change log based on the node change log.

5. The method of claim 4 wherein the act of updating one or more additional nodes comprises:
   polling the cluster change log; and
   updating a third server instance based on the cluster change log, the third server instance resident on a separate node from the first and second server instances .

6. The method of claim 5, wherein the act of polling the cluster change log comprises:
   comparing an LDAP image metadata version number in the cluster change log to an LDAP image metadata version number in a node monitor; and
   determining that the metadata version numbers are not the same.

7. The method of claim 4, wherein the act of polling the node change log comprises:
   comparing an LDAP image metadata version number in the node change log to an LDAP image metadata version number in a server instance; and
   determining that the metadata version numbers are not the same.

8. A computer-implemented method for managing metadata of a cluster database system, comprising:
   receiving a change request at a server of a multi-server node in a multi-node Lightweight Directory Access Protocol (LDAP) network, wherein at least one node of the multi-node LDAP network comprises a plurality of servers;
   modifying an LDAP image on the server based at least in part on the request, wherein the act of modifying comprising a metadata update;
   updating a first change log based at least in part on the request to the LDAP image, the first change log available to all servers in the node;
   updating the LDAP image on one or more other servers in the node based at least in part on the first change log;
   updating a second change log based at least in part on the first change log, the second change log available to all nodes;
   updating a plurality of servers at a second node in the multi-node LDAP network based at least in part on the second change log, wherein the node and the second node share a schema; and
   storing the metadata update in a volatile or non-volatile computer-usable medium.

9. The method of claim 8, wherein the act of modifying the LDAP image comprises:
   modifying the LDAP image; and
   modifying a first server instance local cache.

10. The method of claim 9, wherein the act of updating the LDAP image on one or more other servers in the node comprises:
    polling the first change log;
    updating a second server instance metadata cache based on the first change log; and
    updating a third change log based on the first change log, the third change log available to all servers in the second node.

11. The method of claim 10 wherein the act of updating the plurality of servers at a second node comprises:
    polling the second change log; and
    updating a third server instance based on the second change log, the third server instance resident on a separate node from the first and second server instances.

12. The method of claim 11, wherein the act of polling the second change log comprises:
    comparing an LDAP image metadata version number in the second change log to an LDAP image metadata version number in a node monitor; and
    determining that the metadata version numbers are not the same.

13. The method of claim 10, wherein the act of polling the first change log comprises:
    comparing an LDAP image metadata version number in the first change log to an LDAP image metadata version number in a server instance; and determining that the metadata version numbers are not the same.

14. A cluster database system for managing metadata, comprising:
- means for receiving a change request at a server of the cluster database system, wherein the cluster database system comprises a multi-node Lightweight Directory Access Protocol (LDAP) network and a node of the multi-node LDAP network comprises the server and one or more additional servers;
- a volatile or non-volatile computer usable medium for storing an LDAP image;
- means for modifying the LDAP image on the volatile or non-volatile computer usable medium based at least in part on the request;
- means for updating a change log based at least in part on a metadata change to the LDAP image;
- means for updating one or more server instances that are associated with the node based at least in part on the metadata change to the LDAP image; and
- means for updating one or more additional nodes of the LDAP network based at least in part on the metadata change to the LDAP image, wherein the one or more additional nodes share a schema with the node.

15. The system of claim 14, wherein the means for modifying the LDAP image comprises:
- means for modifying a first server instance local cache.

16. The system of claim 14, wherein the means for Updating the change log comprises:
- means for storing information regarding the change into a node change log, the node change log available to all server instances on a node; and
- means for storing information regarding the change into a cluster change log, the cluster change log available to all nodes in a cluster.

17. The system of claim 16, wherein the means for updating the one or more server instances comprises:
- means for polling the node change log;
- means for updating a second server instance metadata cache based on the node change log; and
- means for updating a second node change log based on the node change log.

18. The system of claim 17, wherein the means for updating the one or more additional nodes comprises:
- means for polling the cluster change log; and
- means for updating a third server instance based on the cluster change log, the third server instance resident on a separate node from the first and second server instances.

19. The system of claim 18, wherein the means for polling the cluster change log comprises:
- means for comparing an LDAP image metadata version number in the cluster change log to an LDAP image metadata version number in a node monitor; and
- means for determining that the metadata version numbers are not the same.

20. The system of claim 17, wherein the means for polling the node change log comprises:
- means for comparing an LDAP image metadata version number in the node change log to an LDAP image metadata version number in a server instance; and
- means for determining that the metadata version numbers are not the same.

21. A volatile or no-volatile computer-usable storage medium containing instructions thereon, the instructions being executable by a computer to cause the computer to perform a method for managing metadata of a cluster database system, the method comprising:
- receiving a change request at a server of the cluster database system, wherein the cluster database system comprises a multi-node Lightweight Directory Access Protocol (LDAP) network and a node of the multi-node LDAP network comprises the server and one or more additional servers;
- modifying an LDAP image at the server based at least in part on the request;
- updating a change log based at least in part on a metadata change to the LDAP image;
- updating one or more server instances that are associated with the node based at least in part on the metadata change to the LDAP image; and
- updating one or more additional nodes of the LDAP network based at least in part on the metadata change to the LDAP image, wherein the one or more additional nodes share a schema with the node.

22. The medium of claim 21, wherein the act of modifying the LDAP image comprises:
- modifying a first server instance local cache.

23. The medium of claim 21, wherein the act of updating the change log comprises:
- storing information regarding the change into a node change log, the node change log available to all server instances on a node; and
- storing information regarding the change into a cluster change log, the cluster change log available to all nodes in a cluster.

24. The medium of claim 23, wherein the act of updating the one or more server instances comprises:
- polling the node change log;
- updating a second server instance metadata cache based on the node change log; and
- updating a second node change log based on the node change log.

25. The medium of claim 24 wherein the act of updating the one or more additional nodes comprises:
- polling the cluster change log; and
- updating a third server instance based on the cluster change log, the third server instance resident on a separate node from the first and second server instances.

26. The medium of claim 25, wherein the act of polling the cluster change log comprises:
- comparing an LDAP image metadata version number in the cluster change log to an LDAP image metadata version number in a node monitor; and
- determining that the metadata version numbers are not the same.

27. The medium of claim 24, wherein the act of polling the node change log comprises:
- comparing an LDAP image metadata version number in the node change log to an LDAP image metadata version number in a server instance; and
- determining that the metadata version numbers are not the same.

* * * * *

UNITED STATES PATENT AND TRADEMARK OFFICE
CERTIFICATE OF CORRECTION

PATENT NO. : 7,617,257 B2
APPLICATION NO. : 11/292495
DATED : November 10, 2009
INVENTOR(S) : Ramaprakash H. Sathyanarayan et al.

It is certified that error appears in the above-identified patent and that said Letters Patent is hereby corrected as shown below:

In column 2, line 37, delete "conFIGuration" and insert -- configuration --, therefor.

In column 7, line 28, in claim 1, delete "networks" and insert -- network, --, therefor.

In column 9, line 27-28, in claim 16, delete "Updating" and insert -- updating --, therefor.

In column 10, line 1, in claim 21, delete "no-volatile" and insert -- non-volatile --, therefor.

Signed and Sealed this

Third Day of August, 2010

David J. Kappos
*Director of the United States Patent and Trademark Office*